United States Patent
Hyuga et al.

(10) Patent No.: US 6,584,129 B2
(45) Date of Patent: Jun. 24, 2003

(54) SINGLE-LONGITUDINAL-MODE SOLID LASER

(75) Inventors: Hiroaki Hyuga, Kaisei-machi (JP); Yoji Okazaki, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/987,051

(22) Filed: Nov. 13, 2001

(65) Prior Publication Data

US 2002/0048299 A1 Apr. 25, 2002

(51) Int. Cl.[7] .................................. H01S 3/14
(52) U.S. Cl. ............................ 372/39; 372/98
(58) Field of Search ...................... 372/107, 19, 18

(56) References Cited

U.S. PATENT DOCUMENTS

| | | | |
|---|---|---|---|
| 5,278,851 A | 1/1994 | Goto | 372/19 |
| 5,502,738 A | 3/1996 | Hyuga | 372/21 |
| 5,506,860 A | 4/1996 | Hyuga et al. | 372/98 |
| 5,657,341 A * | 8/1997 | Hyuga | 372/18 |
| 5,703,900 A * | 12/1997 | Nozaki et al. | 372/107 |
| 5,933,439 A * | 8/1999 | Hyuga et al. | 372/19 |
| 6,049,555 A * | 4/2000 | Ohtsuka et al. | 372/19 |
| 6,295,305 B1 * | 9/2001 | Matsumoto et al. | 372/19 |

FOREIGN PATENT DOCUMENTS

| | | | |
|---|---|---|---|
| JP | 5-218556 | 8/1993 | H01S/3/106 |
| JP | 6-130328 | 5/1994 | G02B/27/28 |
| JP | 7-263785 | 10/1995 | H01S/3/106 |
| JP | 8-186316 | 7/1996 | H01S/3/106 |

* cited by examiner

*Primary Examiner*—Paul Ip
*Assistant Examiner*—Hung T Vy
(74) *Attorney, Agent, or Firm*—Sughrue Mion, PLLC

(57) ABSTRACT

A solid laser produces a laser beam of a 1 μm wavelength band with an Nd-doped solid laser medium. An oscillation mode is brought to a single longitudinal mode with a Fabry-Pérot etalon located within a resonator. An etalon thickness, an etalon reflectivity, an etalon inclination, and a resonator longitudinal mode interval satisfy the relationships, $1.2\% \leq R_N \leq 15\%$ and $0.5° \leq \theta \leq 2.0°$, in which $R_N$ represents an effective reflectivity of the etalon with respect to wavelengths $\lambda = \lambda_0 \pm \Delta\lambda c$ deviating by a resonator longitudinal mode interval $\Delta\lambda c$ from a resonance wavelength $\lambda_0$ of the etalon, and θ represents an inclination of an etalon optical axis with respect to a resonator optical axis.

2 Claims, 5 Drawing Sheets

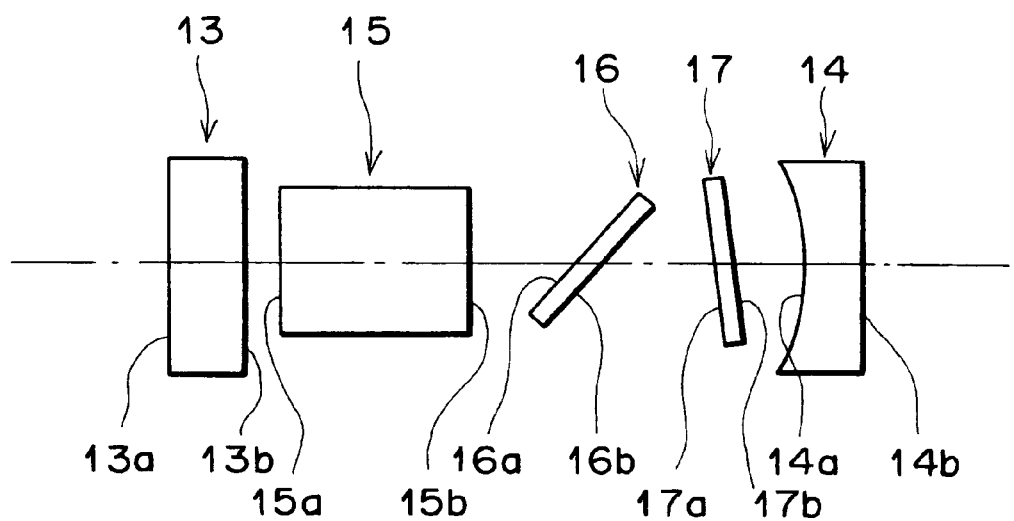
F I G . 2

F I G. 4
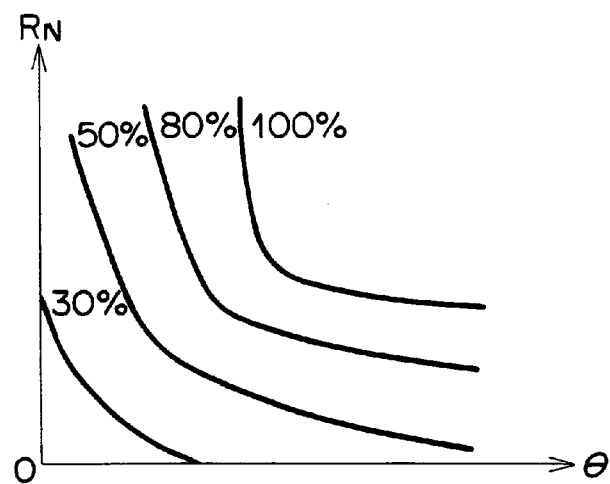
F I G. 5
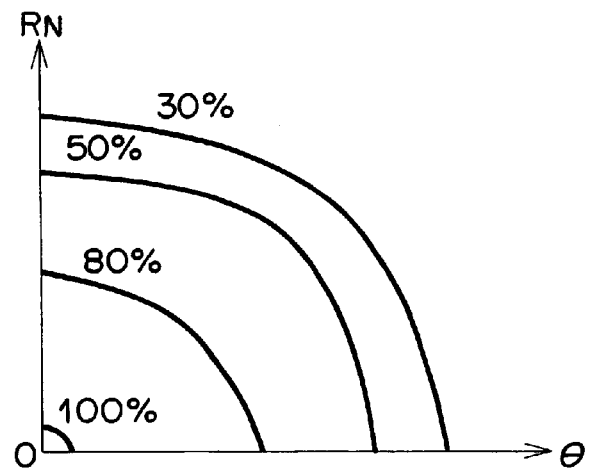
F I G. 6
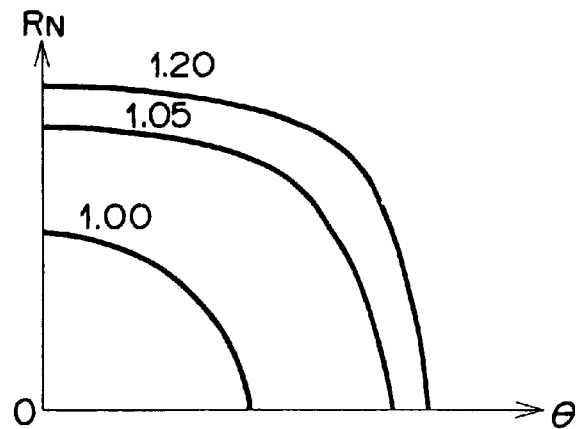

SINGLE-LONGITUDINAL-MODE SOLID LASER

BACKGROUND OF THE INVENTION

1. Field of the Invention

This invention relates to a solid laser. This invention particularly relates to a solid laser, wherein an etalon is located in a resonator in order to bring an oscillation mode to a single longitudinal mode.

2. Description of the Related Art

Various solid lasers, which utilize a solid laser medium doped with neodymium (Nd) and produce a laser beam having a wavelength of a 1 μm band (ranging from approximately 1.0 μm to 1.1 μm), have heretofore been proposed. Examples of the solid laser media doped with neodymium (Nd) include Nd:YVO$_4$, Nd:YAG (Y$_3$Al$_5$O$_{12}$), Nd:YLF (YLiF$_4$), Nd:GdVO$_4$, Nd:YAlO (YAlO$_3$), and Nd:glass. In the solid lasers of such types, a technique is utilized broadly, wherein a Fabry-Pérot type of etalon is located within a resonator in order to bring an oscillation mode to a single longitudinal mode. The solid lasers utilizing the technique described above are described in, for example, Japanese Unexamined Patent Publication Nos. 5(1993)-218556 and 6(1994)-130328, and 7(1995)-263785. (In this specification, the term "etalon" means the Fabry-Pérot type of etalon.)

However, in the conventional single-longitudinal-mode solid lasers, wherein the oscillation mode is brought to the single longitudinal mode by the utilization of the etalon, conditions of the etalon (i.e., the thickness of the etalon, the reflectivity of the etalon, and the inclination of the etalon) and conditions of the resonator (i.e., resonator longitudinal mode intervals), under which good single longitudinal mode characteristics are capable of being obtained, were not clear. Therefore, the problems occur in that, in cases where an etalon, which yields good single longitudinal mode characteristics when being located within a certain resonator, is utilized directly in a different resonator, good single longitudinal mode characteristics cannot be obtained.

Also, the problems occur in that, though good single longitudinal mode characteristics are capable of being obtained, a beam profile becomes bad, and the output becomes low. Thus the conditions of the etalon and the resonator, which simultaneously satisfy the requirements for the single longitudinal mode characteristics, the beam profile, and the output, were not clear.

The inventors conducted extensive research and found that, in cases where each of the thickness of the etalon, the reflectivity of the etalon, and the inclination of the etalon is set at a large value, the single longitudinal mode characteristics become good, but the beam profile becomes bad, and the output becomes low. Also, it was found that, in cases where each of the thickness of the etalon, the reflectivity of the etalon, and the inclination of the etalon is set at a small value, the beam profile becomes good, the output becomes high, but the single longitudinal mode characteristics become bad.

Further, it was found that, in cases where a resonator length is set at a large value (i.e., the resonator longitudinal mode intervals are set to be small), the single longitudinal mode characteristics become bad. Furthermore, it was found that, in cases where the resonator length is set at a small value, the single longitudinal mode characteristics become good, and the beam profile and the output are not much affected by the resonator length.

As for a solid laser, which utilizes Nd:YAG as a solid laser medium and produces a laser beam having a wavelength of a 0.9 μm band, the inventors have already found the conditions of the etalon, under which good, reliable single longitudinal mode characteristics, a good beam profile, and a high output are capable of being obtained simultaneously. The conditions of the etalon are disclosed in Japanese Unexamined Patent Publication No. 8(1996)-186316. However, as for the solid laser, which produces a laser beam having a wavelength of the 1 μm band, appropriate conditions of the etalon have not yet been clarified.

SUMMARY OF THE INVENTION

The primary object of the present invention is to provide a single-longitudinal-mode solid laser, which produces a laser beam having a wavelength of a 1 μm band and which exhibits good, reliable single longitudinal mode characteristics, a good beam profile, and a high output.

The present invention provides a single-longitudinal-mode solid laser capable of producing a laser beam having a wavelength of a 1 μm band, the solid laser comprising:

i) a solid laser medium doped with neodymium, ii) a resonator, and iii) a Fabry-Pérot type of etalon, which is located within the resonator and brings an oscillation mode to a single longitudinal mode, wherein a thickness of the etalon, a reflectivity of the etalon, an inclination of the etalon, and a resonator longitudinal mode interval are adjusted so as to satisfy the relationships represented by the formulas:

$$1.2\% \leq R_N \leq 15\% \text{ and } 0.5° \leq \theta \leq 2.0°$$

in which $R_N$ represents an effective reflectivity of the etalon with respect to wavelengths $\lambda = \lambda_0 \pm \Delta\lambda c$ deviating by a resonator longitudinal mode interval $\Delta\lambda c$ from a resonance wavelength $\lambda_0$ of the etalon, and $\theta$ represents an inclination of an optical axis of the etalon with respect to an optical axis of the resonator.

The single-longitudinal-mode solid laser in accordance with the present invention should preferably be modified such that the thickness of the etalon, the reflectivity of the etalon, the inclination of the etalon, and the resonator longitudinal mode interval are adjusted so as to satisfy the relationships represented by the formulas:

$$3.0\% \leq R_N \leq 10\% \text{ and } 0.80° \leq \theta \leq 1.5°$$

in which $R_N$ represents the effective reflectivity of the etalon, and $\theta$ represents the inclination of the optical axis of the etalon with respect to the optical axis of the resonator.

Effects of the single-longitudinal-mode solid laser in accordance with the present invention will be described hereinbelow.

The Fabry-Pérot type of etalon is a wavelength selecting device utilizing multiple interference of light. FIG. 3 is a graph showing relationships among an effective reflectivity of an etalon, an etalon longitudinal mode, and a resonator longitudinal mode. In FIG. 3, a curve "a" indicates the wavelength characteristics of an effective reflectivity $R_{\mathit{eff}}$ of the etalon. As illustrated in FIG. 3, the effective reflectivity $R_{\mathit{eff}}$ of the etalon changes periodically, and the etalon longitudinal mode occurs at points, at which the effective reflectivity $R_{\mathit{eff}}$ becomes equal to 0 at a wavelength interval $\Delta\lambda e$ (FSR: free spectral range).

In FIG. 3, a curve "b" indicates a gain spectrum of a solid laser medium. Ordinarily, the resonator longitudinal mode occurs at a plurality of points falling within an oscillation wavelength width W in the gain spectrum. Therefore, in cases where the etalon is not utilized, the laser undergoes oscillation in a multiple longitudinal mode. In cases where the etalon is inserted into the resonator, the loss, to which each of the longitudinal modes of the resonator is subjected, is modulated in accordance with the effective reflectivity $R_{eff}$ of the etalon. Also, oscillation occurs only in the mode, which is subjected to the smallest loss among the plurality of the resonator longitudinal modes falling within the wavelength width W.

In the manner described above, with the etalon, the oscillation mode is brought to the single longitudinal mode. However, heretofore, it was not clear how the loss modulation with the effective reflectivity $R_{eff}$ of the etalon and the inclination of the etalon are to be set in order for all of the three requirements with respect to good, reliable single longitudinal mode characteristics, a good beam profile, and a high output to be satisfied.

The inventors conducted extensive research in order to clarify how the loss modulation with the effective reflectivity $R_{eff}$ of the etalon and the inclination of the etalon are to be set in order for all of the three requirements with respect to good, reliable single longitudinal mode characteristics, a good beam profile, and a high output to be satisfied. It was thus found that all of the three requirements described above are capable of being satisfied in cases where appropriate loss modulation is given by setting the effective reflectivity $R_N$ of the etalon with respect to the wavelengths $\lambda=\lambda_0\pm\Delta\lambda c$ deviating by the resonator longitudinal mode interval $\Delta\lambda c$ from the resonance wavelength $\lambda_0$ of the etalon (as illustrated in FIG. 3) so as to fall within a specific range, and in cases where the inclination θ of the optical axis of the etalon is also set so as to fall within a specific range. As described above, the specific range of the effective reflectivity $R_N$ of the etalon is represented by the formula $1.2\%\leq R_N\leq 15\%$, and should preferably be represented by the formula $3.0\%\leq R_N\leq 10\%$. Also, the specific range of the inclination θ of the optical axis of the etalon is represented by the formula $0.5°\leq\theta\leq 2.0°$, and should preferably be represented by the formula $0.8°\leq\theta\leq 1.5°$.

How the effective reflectivity $R_N$ of the etalon is calculated will be described hereinbelow. Firstly, ordinarily, in accordance with Airy's Formulae, the effective reflectivity Reff of the etalon may be represented by Formula (1) shown below.

$$R_{eff} = \frac{F\sin^2(\delta/2)}{1 + F\sin^2(\delta/2)} \quad (1)$$

$$F = \frac{4R}{(1-R)^2}$$

$$\delta = \frac{4\pi n_e l_e}{\lambda}$$

wherein R represents the coating reflectivity of the etalon, $n_e$ represents the refractive index of the etalon, $l_e$ represents the thickness of the etalon, and represents the wavelength of light.

Also, the longitudinal mode interval $\Delta\lambda e$ of the etalon may be represented by Formula (2) shown below.

$$\Delta\lambda e=\lambda_0^2/(2n_e l_e) \quad (2)$$

wherein $\lambda_0$ represents the oscillation wavelength of the etalon.

Thereafter, the resonator longitudinal mode interval $\Delta\lambda c$ is calculated in the manner described below. In cases where media (including air) respectively having refractive indexes of $n_1, n_2, n_3, n_4, \ldots$ stand side by side within the resonator, and the thicknesses of the media are respectively $l_1, l_2, l_3, l_4, \ldots$, a resonator optical path length Lopt may be represented by Formula (3) shown below.

$$L_{opt} = \sum_i n_i l_i \quad (3)$$

Therefore, the resonator longitudinal mode interval $\Delta\lambda c$ may be represented by Formula (4) shown below.

$$\Delta\lambda c=\lambda_0^2/2Lopt \quad (4)$$

From Formulas (1), (2), and (4) shown above, the effective reflectivity $R_N$ of the etalon with respect to the wavelengths $\lambda=\lambda_0\pm\Delta\lambda c$ deviating by the resonator longitudinal mode interval $\Delta\lambda c$ from the resonance wavelength $\lambda_0$ of the etalon may be approximately represented by Formula (5) shown below.

$$R_N = \frac{F\sin^2(\delta_N/2)}{1 + F\sin^2(\delta_N/2)} \quad (5)$$

$$\delta_N = \frac{\Delta\lambda c}{\Delta\lambda e} \times 2\pi$$

Bases for the value ranges of the effective reflectivity $R_N$ of the etalon and the inclination θ of the optical axis of the etalon described above will hereinbelow be described in detail.

(a) Single Longitudinal Mode Characteristics

In the solid laser, in which the oscillation mode is brought to the single longitudinal mode by the utilization of the Fabry-Pérot type of etalon, the resonator temperature is successively changed by 10° C., and the rate of the temperature region, in which the oscillation occurs in the single longitudinal mode, is calculated in units of %. The thus calculated rate of the temperature region is taken as an index for the single longitudinal mode characteristics. Basically, the index for the single longitudinal mode characteristics changes as illustrated in FIG. 4 in accordance with the effective reflectivity $R_N$ of the etalon and the inclination θ of the optical axis of the etalon.

(b) Output

The laser output, which is obtained when an etalon provided with an anti-reflection (AR) coating layer ($R_N=0$) is inserted into the resonator at an etalon inclination θ approximately equal to 0°, is taken as 100%. Also, the effective reflectivity $R_N$ of the etalon and the inclination θ of the optical axis of the etalon are set at various values, and the laser outputs are measured. The ratios of the thus measured laser outputs to the aforesaid laser output taken as 100% were calculated. FIG. 5 shows how the ratio of the measured laser output changes in accordance with the effective reflectivity $R_N$ of the etalon and the inclination θ of the optical axis of the etalon. In the determination of the characteristics, the resonator length was kept at a predetermined value.

(c) Beam Quality

Basically, the beam quality, expressed in terms of the $M^2$ value, changes as illustrated in FIG. 6 in accordance with the effective reflectivity $R_N$ of the etalon and the inclination θ of the optical axis of the etalon. In the determination of the characteristics, the resonator length was kept at a predetermined value.

From the characteristics shown in FIGS. 4, 5, and 6, it is capable of being known in what ranges the effective reflectivity $R_N$ of the etalon and the inclination θ of the optical axis of the etalon are to be set with respect to arbitrary specifications concerning the single longitudinal mode characteristics, the output, and the beam quality. For example, comparatively loose specifications as shown below:

Single longitudinal mode characteristics≧80%

Output≧30%

$M^2$≦1.2 are capable of being accomplished in cases where the effective reflectivity $R_N$ of the etalon and the inclination θ of the optical axis of the etalon are set so as to fall within the range hatched in FIG. 7. In such cases, 1.2%≦$R_N$≦15% and 0.5°≦θ≦2.0°.

Also, for example, comparatively strict specifications as shown below:

Single longitudinal mode characteristics≧100%

Output≧50%

$M^2$≦1.05 are capable of being accomplished in cases where the effective reflectivity $R_N$ of the etalon and the inclination θ of the optical axis of the etalon are set so as to fall within the range hatched in FIG. 8. In such cases, 3.0%≦$R_N$≦10% and 0.8°≦θ≦1.5°.

BRIEF DESCRIPTION OF THE DRAWINGS

FIG. 2 is an enlarged side view showing a major part of the single-longitudinal-mode solid laser of FIG. 1, FIG. 4 is a graph showing how single longitudinal mode characteristics of a solid laser change in accordance with an effective reflectivity $R_N$ of an etalon and an inclination θ of an optical axis of an etalon, FIG. 5 is a graph showing how an output of a solid laser changes in accordance with the effective reflectivity $R_N$ of the etalon and the inclination θ of an optical axis of the etalon, FIG. 6 is a graph showing how beam quality obtained with a solid laser changes in accordance with the effective reflectivity $R_N$ of the etalon and the inclination θ of the optical axis of the etalon.

DESCRIPTION OF THE PREFERRED EMBODIMENTS

The present invention will hereinbelow be described in further detail with reference to the accompanying drawings.

Figure 1:
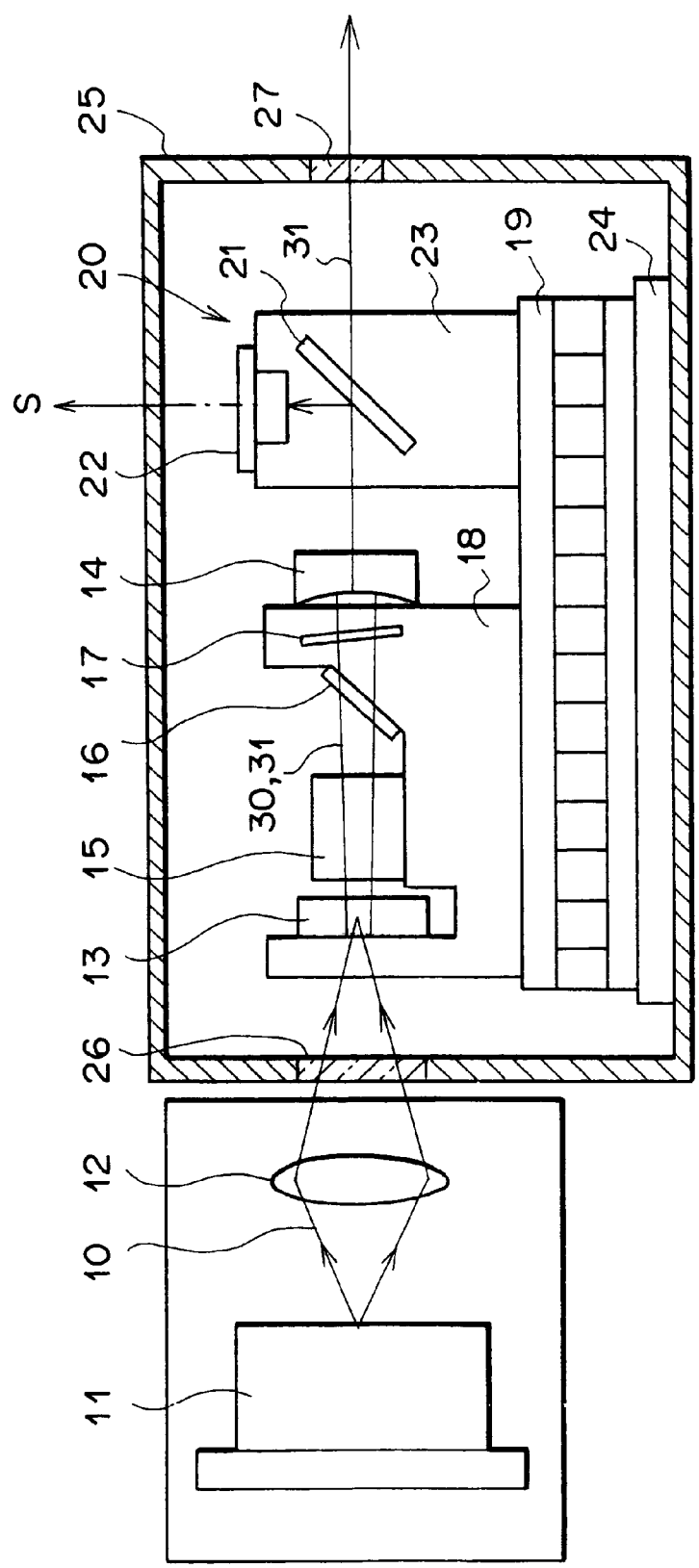
FIG. 1 is a partially broken side view showing an embodiment of the single-longitudinal-mode solid laser in accordance with the present invention.
Figure 3:
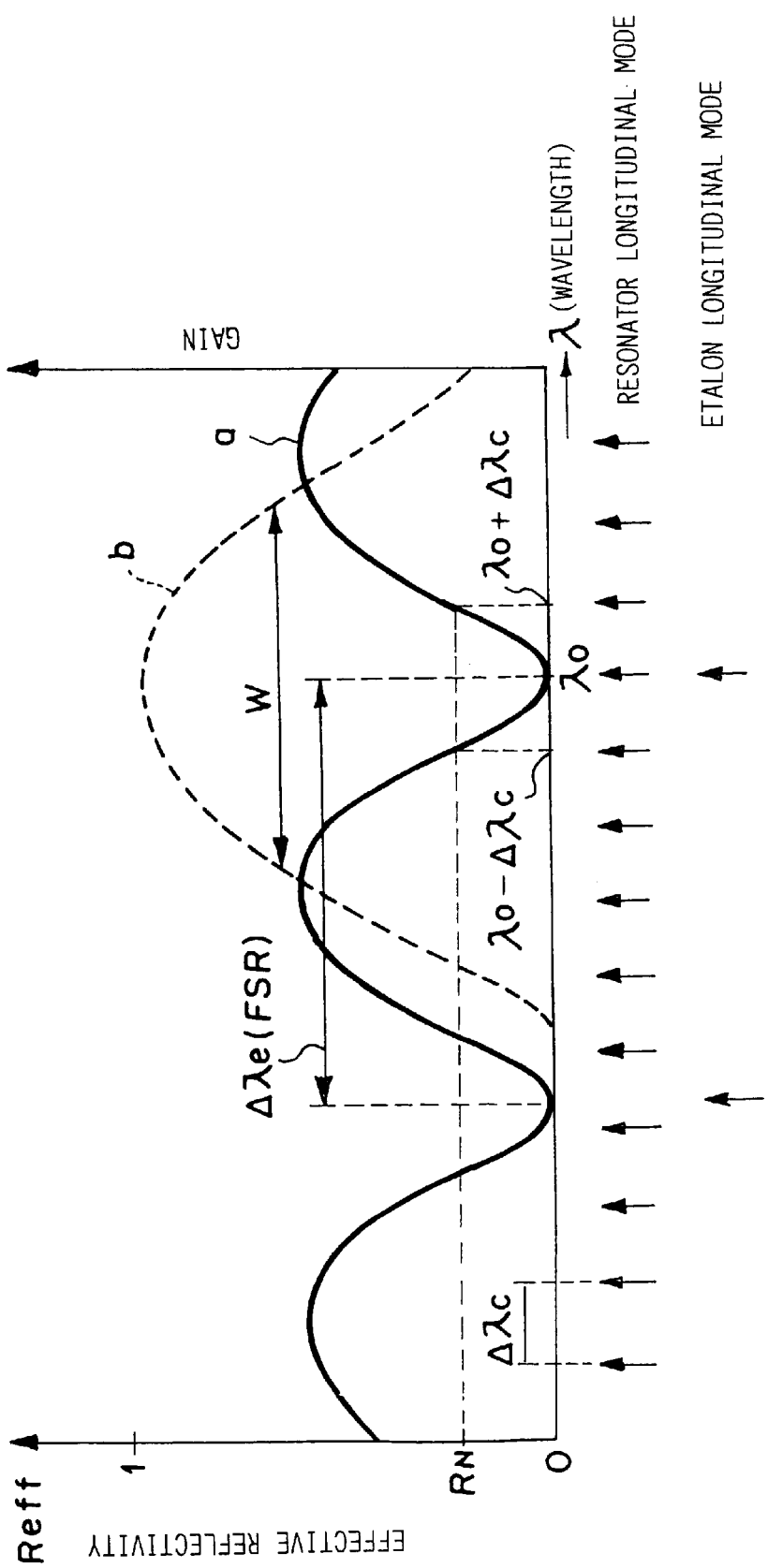
FIG. 3 is a graph showing relationships among an effective reflectivity of an etalon, an etalon longitudinal mode, and a resonator longitudinal mode.
Figure 7:
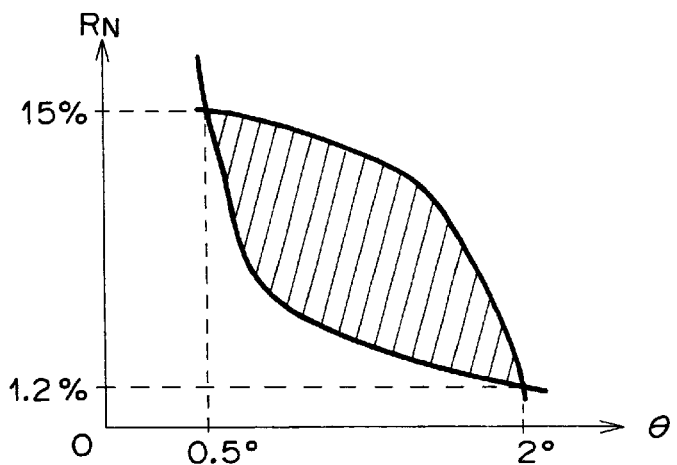
FIG. 7 is a graph showing a preferable range of the effective reflectivity $R_N$ of the etalon and the inclination θ of the optical axis of the etalon.
Figure 8:
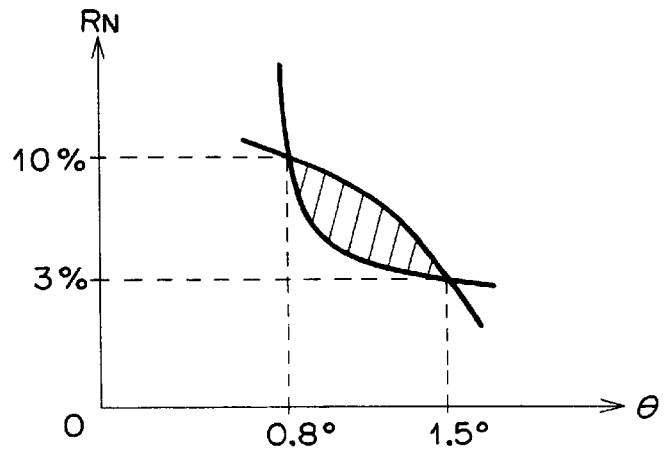
FIG. 8 is a graph showing a more preferable range of the effective reflectivity $R_N$ of the etalon and the inclination θ of the optical axis of the etalon.

FIG. 1 is a partially broken side view showing an embodiment of the single-longitudinal-mode solid laser in accordance with the present invention. By way of example, the single-longitudinal-mode solid laser is constituted as a semiconductor laser pumped solid laser. The single-longitudinal-mode solid laser is provided with a semiconductor laser 11, which produces a laser beam 10 serving as a pumping beam, and a converging lens 12, which converges the laser beam 10 having been produced as divergent light. The single-longitudinal-mode solid laser is also provided with a $YVO_4$ crystal 13, which is a solid laser medium doped with neodymium (Nd). The $YVO_4$ crystal 13 doped with neodymium (Nd) will hereinafter be referred to as the Nd:$YVO_4$ crystal 13. The single-longitudinal-mode solid laser is further provided with a resonator mirror 14, which is located on the side downstream (i.e. the right side in FIG. 1) from the Nd:$YVO_4$ crystal 13.

Further, an optical wavelength converting device 15, a polarization control device 16, and an etalon 17 are located between the Nd:$YVO_4$ crystal 13 and the resonator mirror 14. The optical wavelength converting device 15, the polarization control device 16, and the etalon 17 are located in this order from the side of the Nd:$YVO_4$ crystal 13.

In this embodiment, as will be described later, the Nd:$YVO_4$ crystal 13 and the resonator mirror 14 constitute the resonator of the solid laser. The optical wavelength converting device 15, the polarization control device 16, and the etalon 17 are thus located within the resonator. The Nd:$YVO_4$ crystal 13, the resonator mirror 14, the optical wavelength converting device 15, the polarization control device 16, and the etalon 17 are supported by a common resonator holder 18, which may be made from copper, or the like. The resonator holder 18 is secured to a Peltier device 19. The temperature within the resonator is kept at a predetermined value by the Peltier device 19 and a temperature adjusting circuit (not shown).

Furthermore, an automatic power control (APC) unit 20 is secured to the Peltier device 19. The APC unit 20 is provided with a beam splitter 21 for splitting a second harmonic 31 having a wavelength of 532 nm, which is produced in the manner described later. The APC unit 20 is also provided with a photodetector 22 for detecting the split second harmonic 31. The photodetector 22 may be constituted of a photodiode, or the like.

The Peltier device 19 is located on a metal plate 24, which acts as a reinforcing plate for suppressing strain of the Peltier device 19. The Peltier device 19 is secured via the metal plate 24 to a bottom wall of an enclosed type of package 25. The package 25 is provided with a pumping beam entry window 26 and a second harmonic radiating window 27, into which transparent members have respectively been fitted.

The optical wavelength converting device 15 is constituted of an MgO-doped $LiNbO_3$ crystal, which acts as a nonlinear optical material and in which a periodic domain inversion structure has been formed. The polarization control device 16 is constituted of a non-coated quartz glass plate located at a Brewster angle. The etalon 17 is constituted of a quartz glass plate provided with coating layers at the two end faces. Also, the resonator mirror (output mirror) 14 is constituted of a quartz glass plate, whose one end face is polished into a concave surface and whose two end faces are provided with coating layers.

The semiconductor laser 11 produces the laser beam 10 having a wavelength of 809 nm. The neodymium ions contained in the Nd:$YVO_4$ crystal 13 are excited by the laser beam 10, and the Nd:$YVO_4$ crystal 13 thereby produces light having a wavelength of 1064 nm. Also, laser oscillation is caused to occur by the resonator, which is constituted by the Nd:$YVO_4$ crystal 13 and the resonator mirror 14, as will be described later. In this manner, a solid laser beam 30 having a wavelength of 1064 nm is obtained. The solid laser beam 30 impinges upon the optical wavelength converting device 15 and is converted by the optical wavelength converting device 15 into its second harmonic 31 having a wavelength of 532 nm, which is one half of the wavelength of the solid laser beam 30.

In this embodiment, the optical output of the second harmonic 31, which has been split by the beam splitter 21 of the APC unit 20, is detected by the photodetector 22, and an output signal S is obtained from the photodetector 22. The output signal S is fed from the photodetector 22 into a semiconductor laser driving circuit (not shown). The semiconductor laser driving circuit controls the driving current for the semiconductor laser 11, such that the output signal S becomes equal to a predetermined value. In this manner, the output of the second harmonic 31 is kept at a predetermined level.

FIG. 2 is an enlarged view showing the part ranging from the Nd:YVO$_4$ crystal 13 to the resonator mirror 14. The reflectivities or the transmittances of end faces 13a and 13b of the Nd:YVO$_4$ crystal 13, end faces 15a and 15b of the optical wavelength converting device 15, end faces 17a and 17b of the etalon 17, and end faces 14a and 14b of the resonator mirror 14 with respect to the wavelengths of 809 nm, 1064 nm, and 532 nm described above are adjusted as listed in Table 1 shown below by the provision of appropriate coating layers. End faces 16a and 16b of the polarization control device 16 are not provided with coating layers. In Table 1 below, values in units of % represent the reflectivities. Also, AR represents the anti-reflection coating, HR represents the high-reflectivity coating, and "–" represents that no coating layer is provided.

TABLE 1

| Wavelength | End face | | | | | | | |
|---|---|---|---|---|---|---|---|---|
| | 13a | 13b | 15a | 15b | 17a | 17b | 14a | 14b |
| 809 nm | AR | AR | — | — | — | — | — | — |
| 1064 nm | HR | AR | AR | AR | 60% | 60% | HR | — |
| 532 nm | — | HR | AR | AR | AR | AR | AR | AR |

With the configuration described above, the laser beam 30 having a wavelength of 1064 nm resonates between the end face 13a of the Nd:YVO$_4$ crystal 13 and the mirror surface 14a of the resonator mirror 14. Also, the oscillation mode is brought to the single longitudinal mode by the effects of the etalon 17 described above in detail. Therefore, the second harmonic 31 is also brought to the single longitudinal mode. Approximately only the second harmonic 31 having thus been produced is radiated out from the light radiating end face 14b of the resonator mirror 14.

In this embodiment, the Nd:YVO$_4$ crystal 13, the optical wavelength converting device 15, the polarization control device 16, and the etalon 17 have the refractive indexes and the thicknesses listed in Table 2 below. Also, the resonator length, i.e. the distance between the end face 13a of the Nd:YVO$_4$ crystal 13 and the mirror surface 14a of the resonator mirror 14, is equal to 9.23 mm.

TABLE 2

| | Refractive index | Thickness |
|---|---|---|
| Nd:YVO$_4$ crystal 13 | 2.168 | 1 mm |
| Optical wavelength converting device 15 | 2.13 | 4 mm |

TABLE 2-continued

| | Refractive index | Thickness |
|---|---|---|
| Polarization control device 16 | 1.45 | 0.4 mm |
| Etalon 17 | 1.45 | 0.223 mm |

In cases where the refractive index of air within the resonator is taken as 1, in accordance with Formula (3) shown above, the resonator optical path length Lopt is equal to Lopt=15.2 mm. In such cases, from Formula (4) shown above, the resonator longitudinal mode interval $\Delta\lambda c$ becomes equal to $\Delta\lambda c=0.037$ nm. Also, from Formula (2) shown above, the etalon longitudinal mode interval $\Delta\lambda e$ becomes equal to $\Delta\lambda e=1.75$ nm.

In accordance with the values described above, from Formula (5) shown above, the effective reflectivity $R_N$ of the etalon 17 with respect to the wavelengths $\lambda=\lambda_0\pm\Delta\lambda c$ deviating by the resonator longitudinal mode interval $\Delta\lambda c$ (=0.037 nm) from the resonance wavelength $\lambda_0$ (=1064 nm) of the etalon 17 becomes equal to $R_N=6.27\%$. Also, the etalon 17 is located such that the optical axis of the etalon 17 is inclined by an angle of $\theta=1.00$ with respect to the optical axis of the resonator. As described above, in this embodiment, the relationships represented by the formulas $1.2\%\leq R_N\leq 15\%$ and $0.5°\leq\theta\leq 2.0°$ are satisfied. Further, the preferable relationships represented by the formulas $3.0\%\leq R_N\leq 10\%$ and $0.8°\leq\theta\leq 1.5°$ are also satisfied.

Experiments conducted with the single-longitudinal-mode solid laser having the constitution described above revealed that, in cases where the output of the semiconductor laser 11 was 2 W, the second harmonic 31 with an output of 500 mW was capable of being obtained from the reliable, single longitudinal mode oscillation. Also, it was found that the second harmonic 31 was in a TEM$_{00}$ mode and was an approximately ideal Gaussian beam.

In the embodiment described above, the Nd:YVO$_4$ crystal 13 is employed as the solid laser medium. The single-longitudinal-mode solid laser in accordance with the present invention is also applicable to various solid lasers, which produce a laser beam having a wavelength of the 1 $\mu$m band and which utilize one of various other solid laser media, such as Nd:YAG, Nd:YLF, Nd:GdVO$_4$, Nd:YAlO, and Nd:glass. In such cases, the same effects as those described above are capable of being obtained.

Also, the single-longitudinal-mode solid laser in accordance with the present invention is also applicable to solid lasers, in which the produced laser beam is not subjected to conversion into its second harmonic, or the like, with the optical wavelength converting device.

What is claimed is:

1. A single-longitudinal-mode solid laser capable of producing a laser beam having a wavelength of a band ranging from 1 $\mu$m to 1.1 $\mu$m, the solid laser comprising:
   i) a solid laser medium doped with neodymium,
   ii) a resonator, and
   iii) a Fabry-Pérot type of etalon, which is located within the resonator and brings an oscillation mode to a single longitudinal mode,
   wherein a thickness of the etalon, a reflectivity of the etalon, an inclination of the etalon, and a resonator longitudinal mode interval are adjusted so as to satisfy the relationships represented by the formulas:

$$1.2\%\leq R_N\leq 15\% \text{ and } 0.5°\leq\theta\leq 2.0°$$

in which $R_N$ represents an effective reflectivity of the etalon with respect to wavelengths $\lambda=\lambda_0\pm\Delta\lambda c$ deviating by a resonator longitudinal mode interval $\Delta\lambda c$ from a resonance wavelength $\lambda_0$ of the etalon, and $\theta$ represents an inclination of an optical axis of the etalon with respect to an optical axis of the resonator.

2. A single-longitudinal-mode solid laser as defined in claim 1 wherein the thickness of the etalon, the reflectivity of the etalon, the inclination of the etalon, and the resonator longitudinal mode interval are adjusted so as to satisfy the relationships represented by the formulas:

$$3.0\% \leq R_N \leq 10\% \text{ and } 0.8° \leq \theta \leq 1.5°$$

in which $R_N$ represents the effective reflectivity of the etalon, and $\theta$ represents the inclination of the optical axis of the etalon with respect to the optical axis of the resonator.

* * * * *